United States Patent [19]
Kuts

[11] 3,943,806
[45] Mar. 16, 1976

[54] TIRE TRUING MACHINE
[75] Inventor: Mathew Kuts, Akron, Ohio
[73] Assignee: The B. F. Goodrich Company, Akron, Ohio
[22] Filed: Feb. 21, 1975
[21] Appl. No.: 551,891

[52] U.S. Cl. .................. 82/49; 82/100; 82/101; 157/13
[51] Int. Cl.² .............. B23B 5/14; B29H 21/08
[58] Field of Search .......... 82/47–49, 100, 82/101; 157/13

[56] References Cited
UNITED STATES PATENTS

| | | | |
|---|---|---|---|
| 2,121,062 | 6/1938 | Vincke | 82/49 |
| 2,986,205 | 5/1961 | Okerstrom | 157/13 |
| 3,584,673 | 6/1971 | Lehman | 157/13 |
| 3,604,084 | 9/1971 | Krieger et al. | 157/13 X |

Primary Examiner—Leonidas Vlachos
Attorney, Agent, or Firm—Joseph Januszkiewicz; W. A. Shira, Jr.

[57] ABSTRACT

A tire truing machine that has a continuously orbiting band saw moving across a tool guide that has a plurality of adjustable guide members that can be shaped to the profile of the tire to be trued or contoured to a preexisting cam profile with the cumulative guide members defining an arcuately shaped recess or guide which positions the cutting edge of a band saw adjacent to the tread of a pneumatic tire in a precise profile control. The tire is chucked and rotated as the band saw operates on the tread surface or portions thereof to the profile set or adjusted.

26 Claims, 18 Drawing Figures

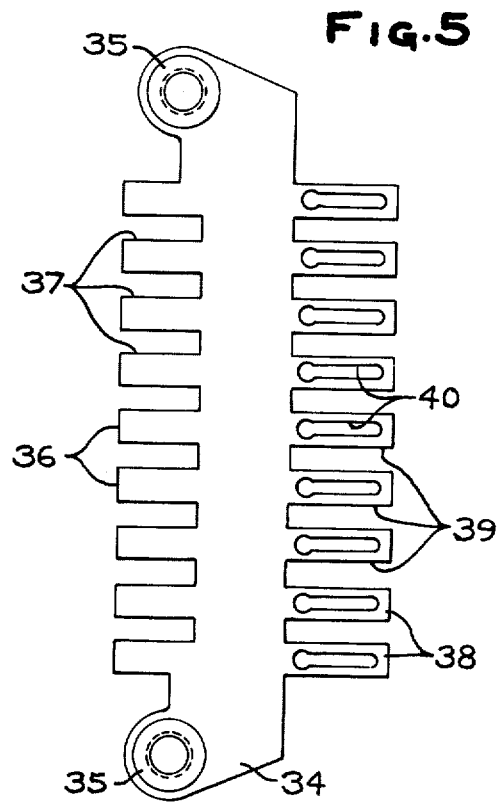
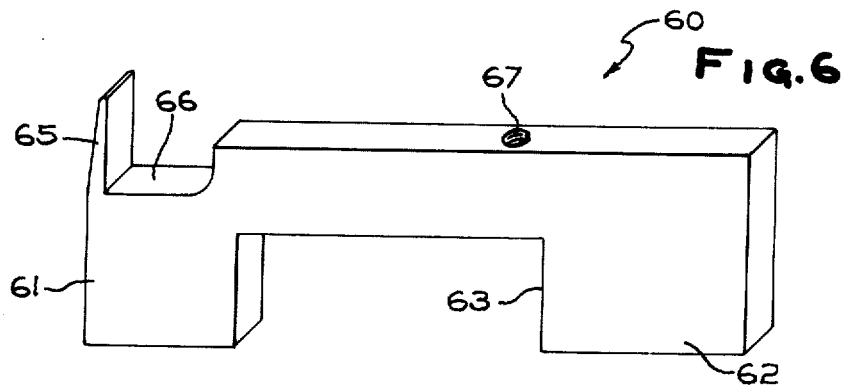
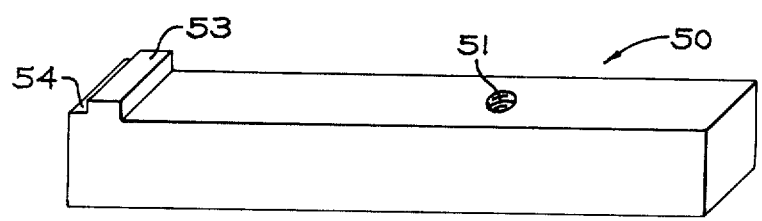

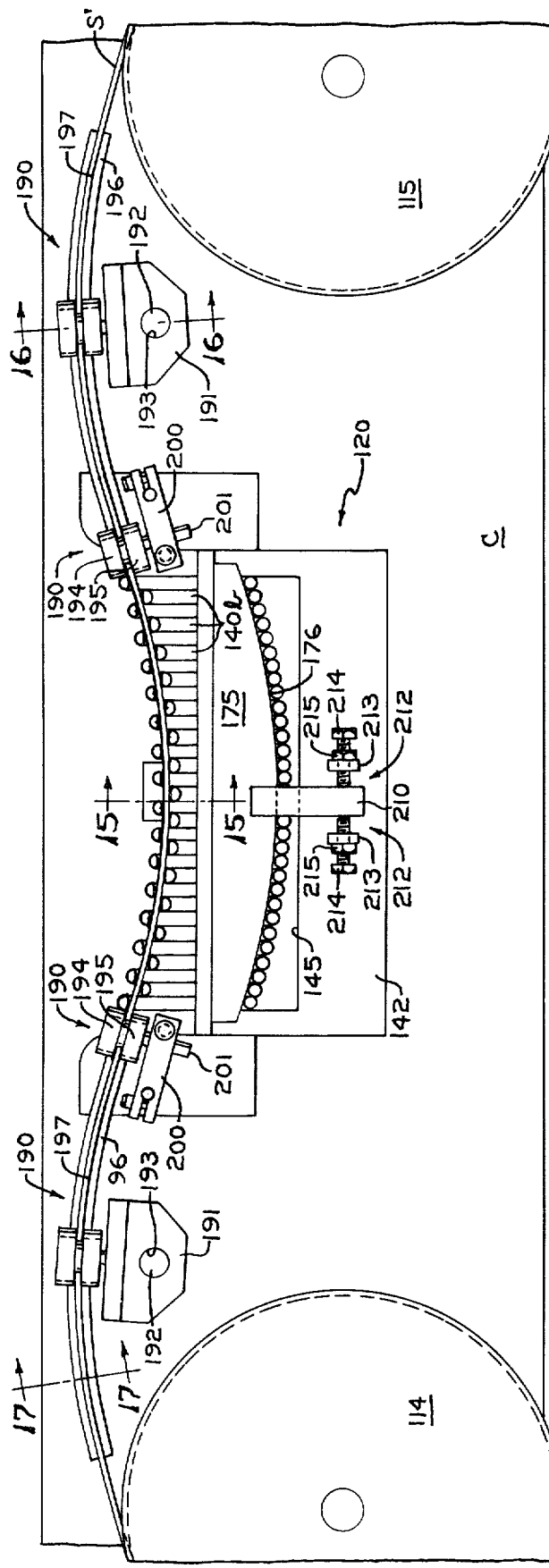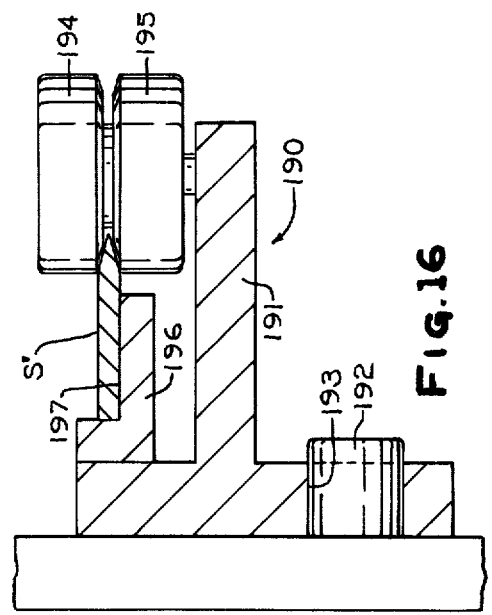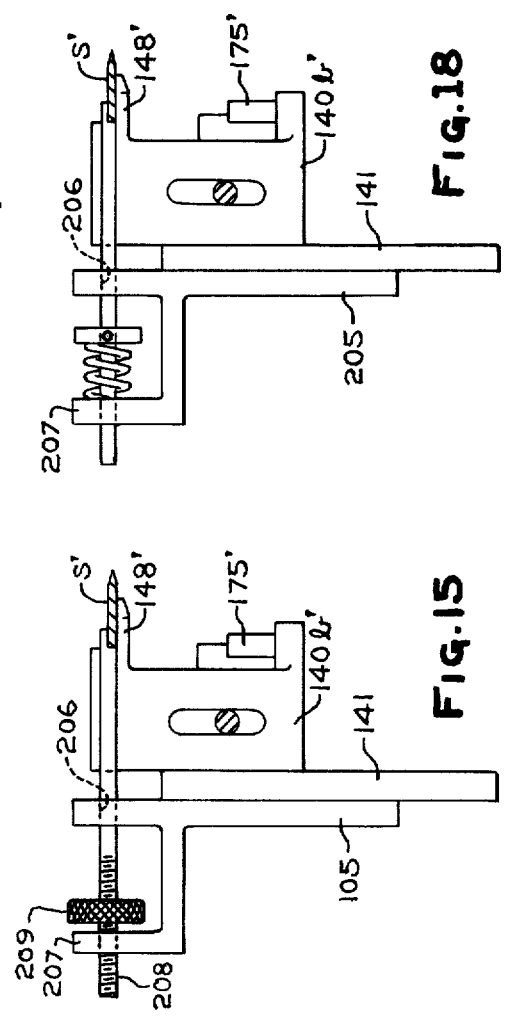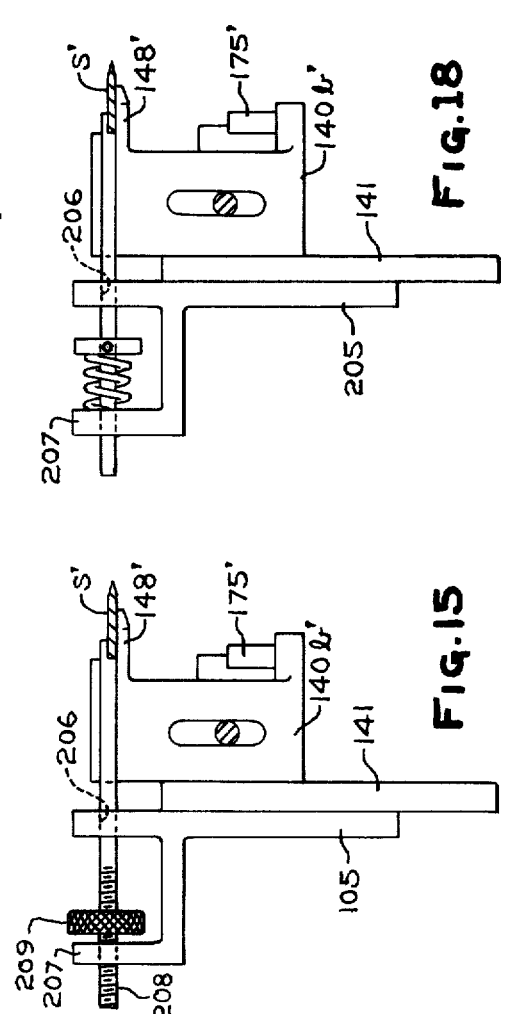

TIRE TRUING MACHINE

BACKGROUND OF THE INVENTION

This invention relates to a tire truing machine and more particularly to a new and improved tire truing machine which employs a band saw as the cutter.

In the manufacture of tires and through the use thereof, it is not infrequent that small degrees of out-of-roundness occur which cause vibration, uneven wear, and poor roadability. Where out-of-roundness occurs, unless steps are taken to correct such unevenness, further imbalance will develop within the tire. Due to the high speeds at which vehicles now travel, it is extremely important to have tires that are extremely uniform in their radial dimension.

Several types of tire truing machines are employed. One such machine employs a trimming knife that is moved transversely across the face of a tire while others employ grinding wheels or an abrading tire rasp to remove material therefrom. In the case of grinding wheels, one problem encountered is that the material removed is not uniform due to the tread design, wherein the grinding wheel removes chucks of rubber tire tread at the edges of the tire elements or blocks. Such elements or blocks are of various configurations including rectangular, diamond, square or triangular shapes. Machines employing trimming knives must be traversed across the face of a tire slowly to assure a smooth cut, which is time consuming. The present invention overcomes these deficiencies and is able to feather the trimming cut to the contour of the original tire without removing excess material in a rapid accurate manner.

SUMMARY OF THE INVENTION

The present invention contemplates an apparatus for truing pneumatic tires wherein a continuously moving band saw is guided for a small portion of its orbit over guide means which have a plurality of adjustable segments, or members, that have their forwardly disposed portion recessed to guide an endless band saw along the periphery of a tire. Such members or guide segments are adjustable to the profile of a cam and to the depth of cut such that as a tire is rotated, the continuously moving band saw trims or skives the circumferential tread to a uniform radial dimension. Guide means are provided which maintains the precise position of the band saw in its trimming or skiving operation.

It is an object of this invention to true tires in a uniform accurate manner providing a profile cut that is consistent with the full profile of the tire whose edges are feathered during the truing operation to enhance the aesthetic quality of the tire. It is important that such trimmed cut be accurate to enhance its quality of performance as well as its appearance.

BRIEF DESCRIPTION OF THE DRAWINGS

FIG. 5 is an enlarged plan view of a plate in the tool holder;

FIG. 6 is a perspective view of one of the intermediate adjustable segments;

FIG. 7 is a perspective view of one of the front elevational view of a modified form of the invention;

FIG. 14 is a fragmentary front elevational view of a further modified form of the invention showing a tool holder guiding an endless band-saw;

FIG. 15 is a cross-sectional view of the tool holder taken on lines 15—15 of FIG. 14 showing the band-saw in a contour for cutting the run-out on the profile of a tire;

FIG. 16 is a cross-sectional view of the tool holder and guide means taken on lines 16—16 of FIG. 14;

FIG. 18 is a cross-sectional view of a modified form of the tool holder and band-saw guide;

DETAILED DESCRIPTION

Figure 2:
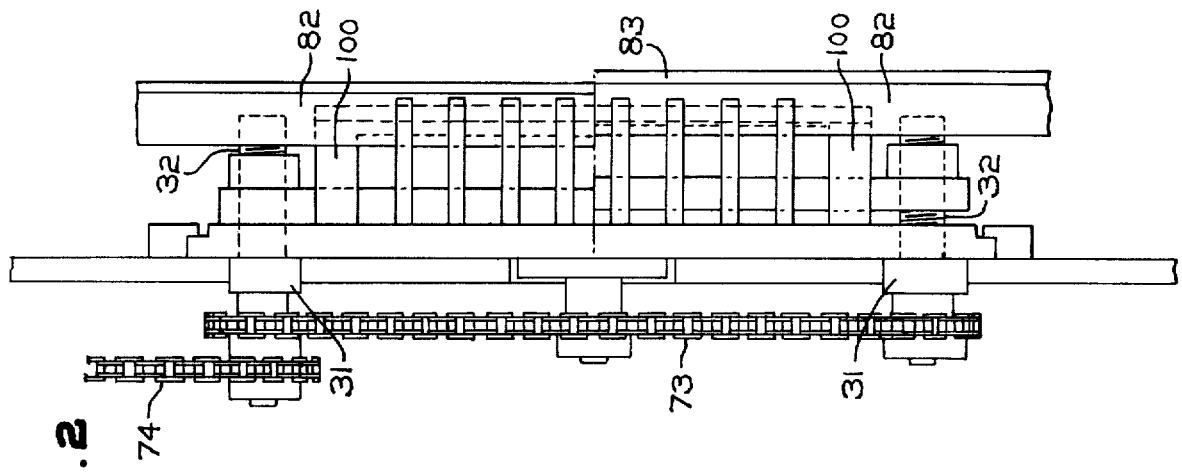
FIG. 2 is an enlarged fragmentary side view of the segments of the tool holder which guides the endless band-saw.
Figure 1:
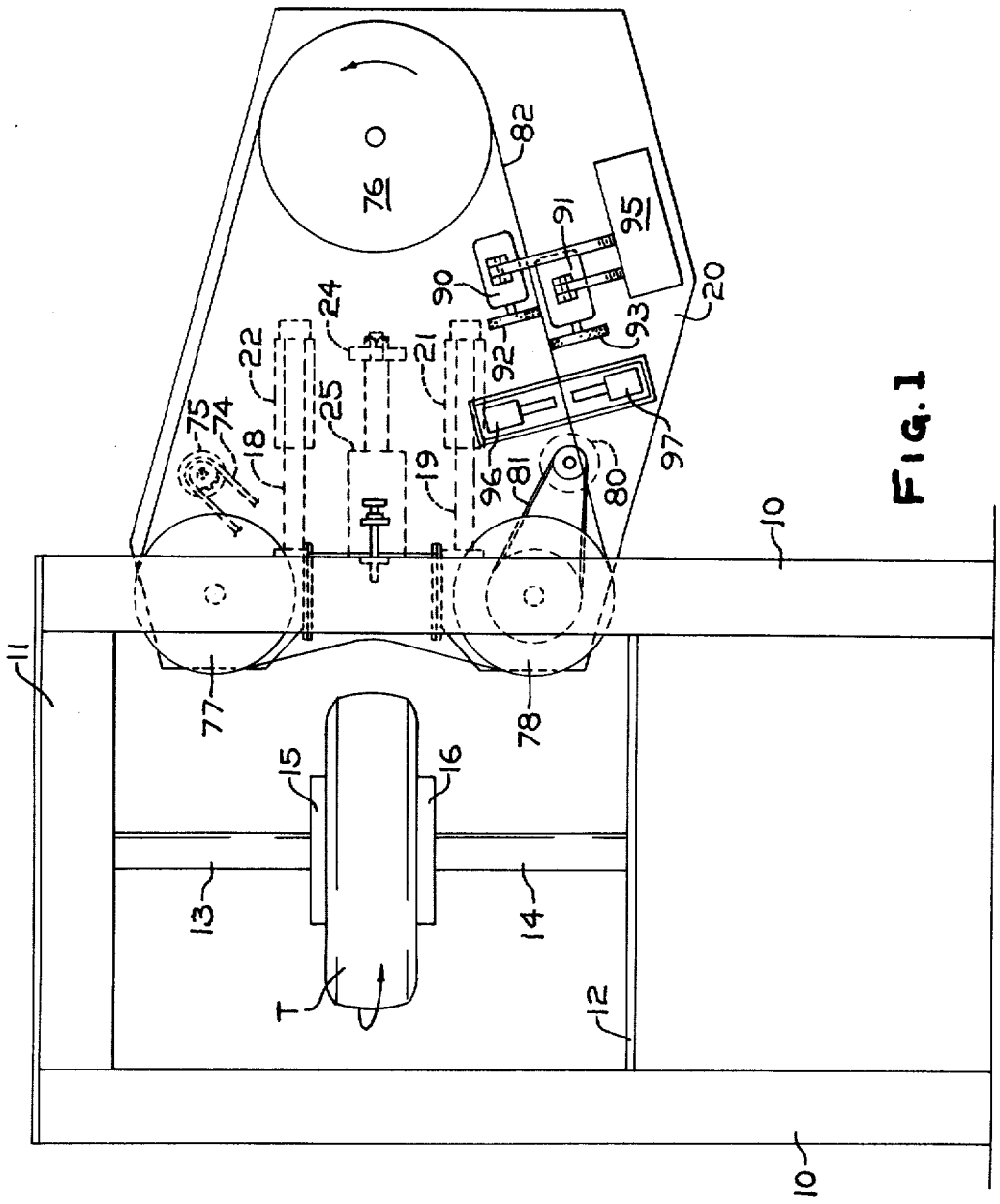
FIG. 1 is a front elevational view of a tire truing machine with a tire chucked for rotation.
Figure 3:
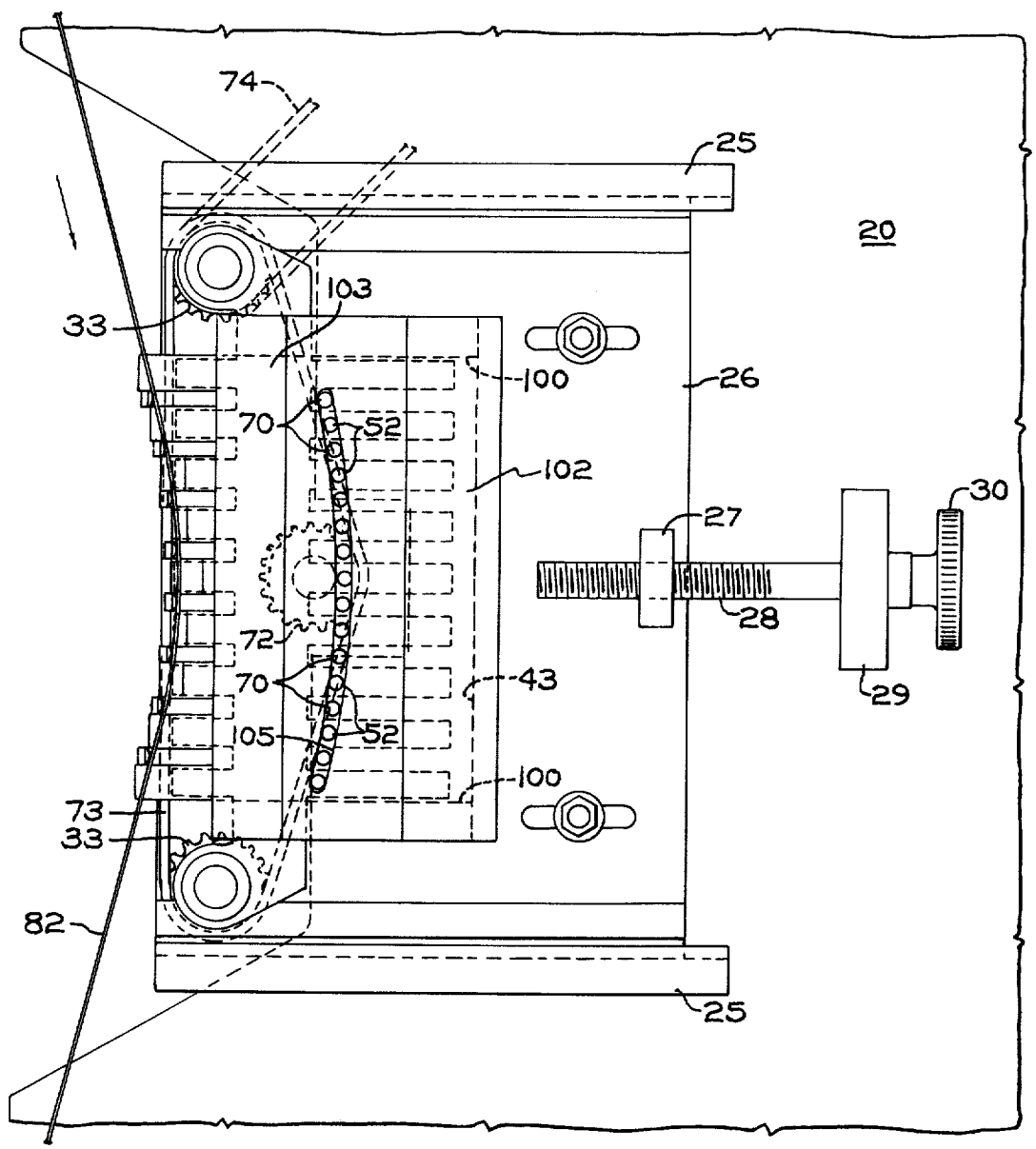
FIG. 3 is an enlarged front elevation view of the tool holder shown in FIGS. 1 and 2.
Figure 4:
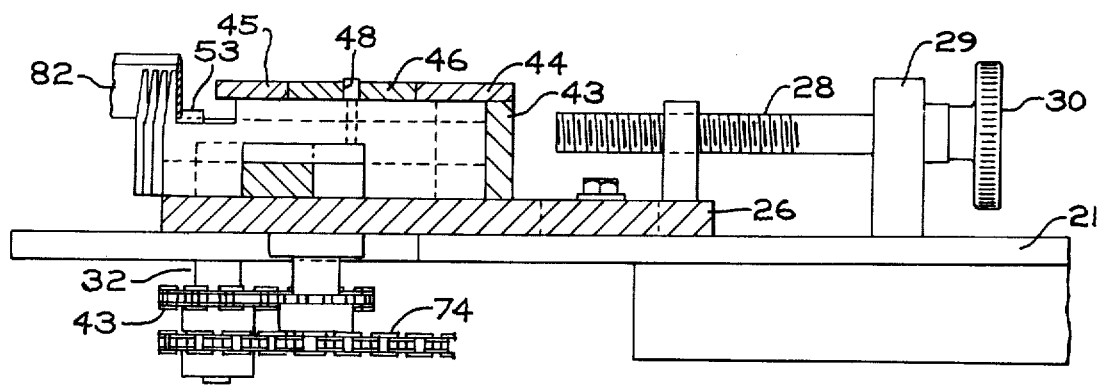
FIG. 4 is a cross-sectional view of the tool holder.
Figure 9:
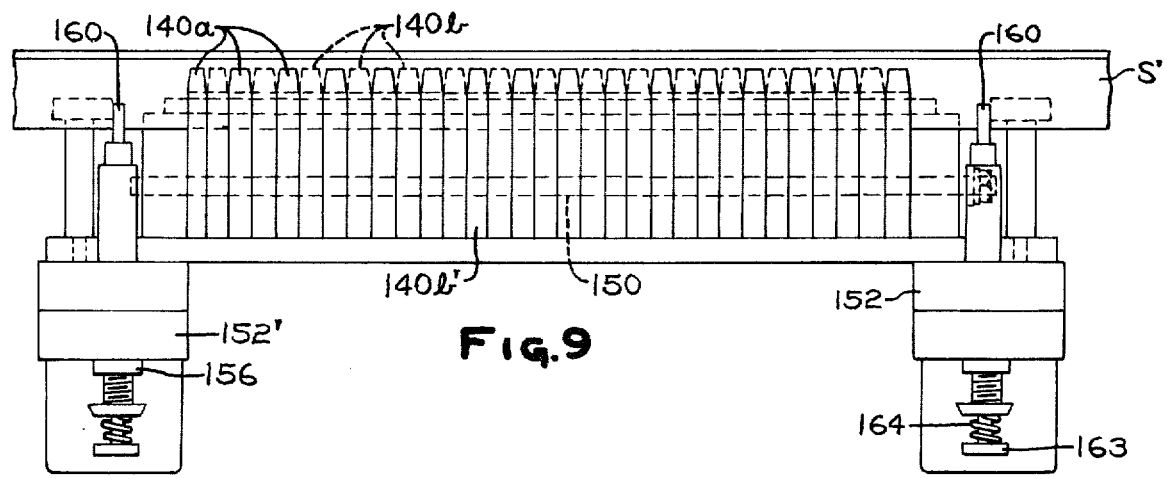
FIG. 9 is an enlarged fragmentary plan view of the segments of the modified form's tool holder shown in FIG. 8 which tool holder guides the endless band-saw.

Referring now to the drawings wherein like references characters designate like or corresponding parts throughout the several views. There is shown in FIG. 1 a structural support means having a plurality a vertical extending supports 10, which support vertically spaced, horizontally extending frame members 11 and 12. Such frame members 11 and 12 suitably support for rotation shafts 13 and 14 which have rim flanges 15 and 16 mounted on adjacent ends thereof. Such rim flanges 15 and 16 are movable toward and away from each other to provide chuck means for supporting a tire T for rotation therewith. Suitably mounted on the frame members are driving means such as a motor, transmission means and a clutch elements to provide rotation to the rim flanges 15 and 16 and a tire T mounted therebetween in a manner old and well known in the art. FIG. 1 diagrammatically illustrates this feature, and reference is made to U.S. Pat No. 3,552,200 which illustrates one example of a drive means for such rim flanges. Suitably secured to one of the vertically extending supports 10 are a pair of horizontally extending guide member 18 and 19. A carriage member 20 is reciprocably mounted on the guide members 18 and 19 by bosses 21 and 22. Only two bosses 21 and 22 are shown connected to carriage member 20, although more bosses may be employed to provide greater stability in guiding carriage member 20 to and from the tire T in a manner to be described. The head end of a pneumatic cylinder 23 which is suitably secured to the structural frame members such as one of the vertically extending supports 10, has its piston rod suitably secured to a bracket 24 whereby pressurization of the rod end of cylinder 23 moves the carrier member 20 towards the rotational axis of tire T. A pair of parallel guide ways 25 are mounted on carrier member 20. A tool slide member 26 is mounted on carrier member 20 with its respective edge portions slidably received by the guide members 25 to guide the movement thereof. Tool slide member 26 has a threaded boss 27 to threadedly receive a threaded shaft 28. A boss 29 substantially in alignment with bosses 27 is mounted on carrier member 20 to provide means for journaling for rotation the one end portion of threaded shaft 28. Such one end portion of threaded shaft 28 has a knurled knob 30 secured thereto to provide means for rotating threaded shaft 28 whereby tool slide member 26 is moved toward and away from the axis of the tire T. Tool slide member 26 (FIG. 2) has a pair of forwardly disposed bosses 31 secured thereto which journal for rotation threaded shafts 32—32. The lower portion of threaded shaft 32 has sprocket means 33 secured thereto for rotating such threaded shafts in a manner to be described. The upper end portions of threaded shafts 32 are threadedly connected to a tool support 34. Such tool support 34 is shown in plan view in FIG. 5 and comprises an elongated member with bosses 35—35 at the respective end portions which threadedly receive the threaded shaft 32. The one side portion of tool support 34 has a plurality of projections 36 on one side thereof defining a plurality of recesses 37 therebetween. The other side portion of the tool support 34 has a plurality of rearwardly extending projections 38 which define a plurality recesses 39 therebetween. Each of said rearwardly extending projections 38 has an elongated recess 40 for purpose to be described. The reciprocable movement of tool support 34 relative to tool support means 26 is guided between a pair of spaced side plates 42—42, which side plates are suitably secured to tool slide member 26. The one side edges of plates 42—42 are interconnected by an end plate 43. Extending between and secured to the side plates 42 and end plate 43 is a cover plate 4. Spaced from cover plate 44 and secured to side plates 42 is a bridge plate 45. Positioned between plate 44 and 45 is a cam plate 46 having a cam slot 48 therein that is contoured to the shape of the desired cut to be made on the profile of a tire.

Secured to each pair of aligned projections 36 and 38 of tool support 34 is an elongated rectangular shaped guide member 50. Each guide member 50 has a bore 51 which receives a threaded bolt 52 which suitably secures the respective guide members 50 to the tool support 34 for movement therewith. The top portion of each bolt 52 is rounded to frictionally engage the cam slot 48 on cam plate 46. The forwardly disposed portion of guide member 50 has an abutment 53 extending upwardly therefrom providing a flat surface 54 for contacting the bottom surface of a band saw. Mounted on the tool support 40 is a U-shaped guide member 60, which has a pair of downwardly depending leg portions 61 and 62 defining a recess 63 therebetween. The guide members 60 are positioned on the tool support 34 between respective guide members 50 such that the respective leg portions 61 and 62 are received by the respective recesses 37 and 39, whereby the recess 63 is of sufficient depth that relative adjustment of the tool support 34 will not interfere with the position of the guide members 60. As viewed in FIG. 6, the forwardly disposed portion of guide member 60 has an upwardly extending projecting member or abutment 65 that cooperates with an adjacent flat surface 66 to provide a recess that acts as a guide means for a band saw to be described. The abutment 53 on guide member 50 cooperates with the flat surface 54 to provide a recessed portion that cooperates with the projecting member 65 and flat surface 66 of guide member 60 to provide a guideway therethrough for guiding the band saw to be described. The intermediate portion of guide member 60 has a threaded bore 67 which receives a threaded bolt 70 whose rounded head portion acts as an abutment means which frictionally engages the cam slot 48 of cam plate 46 to position the projecting member 65 into the desired position relative to the central axis of the tire to guide the cutting edge of the band saw.

The undersurface of tool slide member 26 has an idler sprocket 72 suitably secured thereto. Trained about sprockets 33 and 72 is a chain drive 73 which controls the rotation of shafts 32 and the relative positioning of tool support 34. One of the shafts 32 has an additional sprocket keyed thereto (FIG. 2) about which is trained a drive chain 74 which is connected to a drive motor 75 which controls the rotation of the sprockets 33 and the shafts 32.

Mounted on the one end portion of carriage 20 is a pulley 76. Mounted on the other end of carriage 20 is a pair of spaced pulleys 77 and 78. A motor 80, mounted on carriage 20 has its output connected via a chain 81 to drive pulley 78. Suitably trained about pulleys 76, 77 and 78 is a band saw 82 having a continuous outer cutting edge 83. Mounted on carriage 20 are a pair of motors 90 and 91 having their output shafts connected to grinders 92 and 93. The respective grinders 92 and 93 are adjusted by a control means depicted generally as 95 in FIG. 1 which in turn is controlled by a pair of electronic sensors 96 and 97. Sensor 96 and 97 direct a beam across the path of the cutting edge 81 of band saw 82 and upon sensing of a gap, such sensors send a signal to control means 95 to adjust the grinders and also to control motor 75 which raises the tool support 34.

In the operation of the tire truing apparatus described, the operator places a tire T on the tire rim flanges 15 and 16 and inflates the tire T from a suitable pressure source via suitable conduit means. The tool slide member 26 is then conditioned to shape the band saw 82 to the profile of the tire to be trued. The cam plate 46 has the cam slot 48 engaging the respective heads of bolts 52 and 70 thereby positioning the guide means which includes guide members 60 and 50 such that the band saw 82 adjacent to the tire T is contoured to the shape of the crown profile of a tire T. The tire T is then rotated and motor 80 energized to orbit the band saw 82. The head end of cylinder 23 is pressurized which moves its piston rod along with bracket 24 and carriage 20 leftward as viewed in FIG. 1, which thereby moves the guide means in a leftwardly direction to position the edge of the band saw 82 into cutting engagement with the tire T. The tool slide member 26 along with the guide means and the cutting edge of the band saw 80 guided thereby can be moved incrementally toward the central axis of the tire T by rotating threaded shaft 28 which may be done by a stepping motor or by a programmed control circuit. The cutting edge 83 of the band saw 82 is continuously monitored by sensors 96 and 97 which provide an output signal to control the energization of motor 75 which in turn provides for the rotation of sprockets 33 via chains 74 and 73 to control of incremental movement of tool support 34 and its guide means relative to the tool slide member 26 which adjusts the position of the cutting edge 83 relative to the tire T. Grinders 91 and 92 are operable to keep a sharp cutting edge on the band saw 80.

Figure 8:
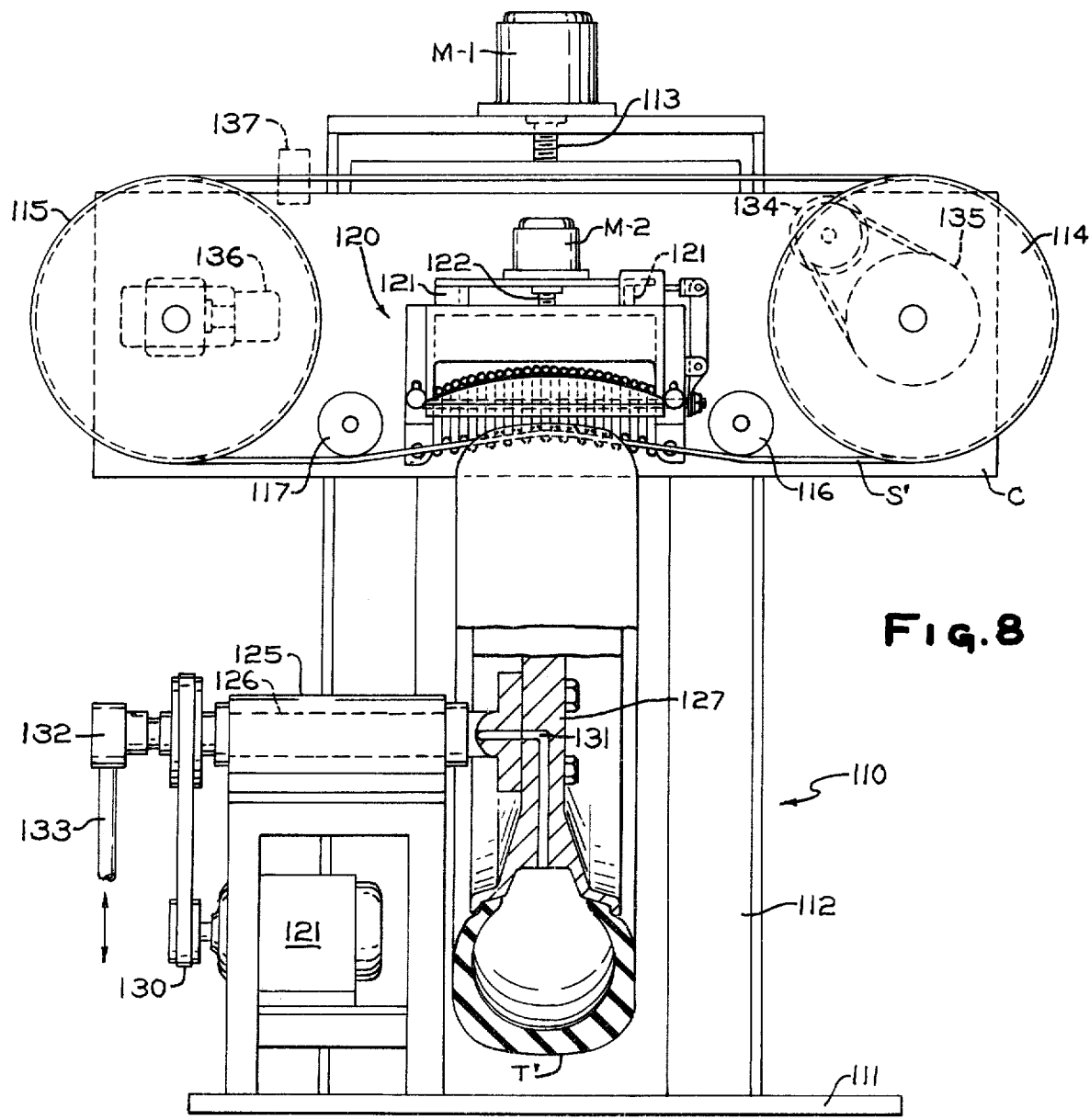
FIG. 8 is a front elevational view of a modified form of the tire truing machine with a portion of the tire shown in cross section.

A modification of the apparatus is illustrated in FIGS. 8 through 18 wherein there is shown in FIG. 8 a support means 110 which includes a base 111 and an inverted U-shaped member 112. Mounted on U-shaped member 112 are ways for guiding the movement of a carriage C toward and away from a tire T'.

A motor M-1 is suitably secured to the cross brace portion of the U-shaped member 112 having its output shaft 113 connected to a nut on carriage C for adjusting its position relative to the T'. Pulleys 114 and 115 are suitably journaled on the respective end portions of carriage C, about which is trained an endless band-saw S'. Idler rollers 116 and 117 are mounted on the forward portion of carriage C to guide the band-saw S' toward and away from the tool support means 120.

Carriage C has a pair of spaced guideways 121 connected together via bracket means on which is mounted a motor M-2. Tool support means 120 is mounted for linear adjustment on guideways 121. Motor M-2 has its output shaft 122 connected to tool support means 120. Mounted on one of the vertically extending legs of U-shaped member 112 is a tire support means or a chucking means which includes a housing 125 which supports for rotation a shaft 126. The one end of shaft 126 has secured thereto a quick dismount tire flange 127, which flange 127 supports for rotation therewith a tire T'. Other chucking means may be used other than those shown.

Suitably mounted upon support means 110 is a variable speed motor 129 which has its output shaft operatively connected via belt 130 to drive shaft 126 and tire T'. Shaft 126 has a passageway 131 extending longitudinally therethrough which connects to a passageway in tire flange 127 which, in turn, communicates with the tire T'. The passageway 131 is connected by a rotary union 132 and conduit 133 to a suitable pressure source by which tire T' is inflated.

A variable speed motor 134 mounted on carriage C has its output connected to a pulley 135 which is keyed to pulley 14. Biasing means 136 is connected to pulley 115 to maintain a tension thereon as well as the band-saw S' trained about pulleys 114 and 115. Suitable control means not shown are provided to vary the speed of motor 134 to provide preselected speeds for band-saw S' over a suitable range of values. Band-saw S' is trained about pulleys 114, 115, 116 and 117, as well as the respective guide segments 140a and 140b of tool support means 120 to be described.

Tool support means 120 has a plate member 141, a U-shaped upper plate member 142 with a U-shaped channel 143 interconnecting such plate members 141–142. The U-shaped upper plate 142 has an elongated bar 144 that extends across the one end portion, defining a recess 145 between the base of the U and the bar 144. Bar 144 acts as an abutment for a purpose to be described. Slidably mounted in the tool support means 120 are the plurality of rectangular shaped guide segments, or guide members 140a and 140b. Segments 140a alternate with segments 140b. The respective rear upper portion of each guide segments 140a and 140b has a projection or abutment means 146. Segments 140a and 140b alternate in their construction with respect to the outermost or forwardlymost portion, wherein all of the segments 140a have a projection 147 while segments 140b have projection 148. Projections 147 and 148 are recessed as at 147a and 148a respectively such that such recesses cooperate in their side by side relationship as shown in FIG. 14 to form an adjustable arcuately shaped guideway for the band-saw S' with the bottom surface of the guideway limiting any axial displacement of the band-saw to assure an accurate movement of the band-saw S'. All of the segments 140a and 140b have a slot 149 which permits a rod 150 to extend longitudinally therethrough. The one end segment designated 140a' has its slot counterbored as at 149' to accommodate the enlarged head 150' of the rod 150 for clamping the segments into position. The center segment designated 140b' (FIG. 9) may be fixed to the tool holder 120, which segment 140b' acts as a reference point from which the other segments are adjusted.

Figure 10:
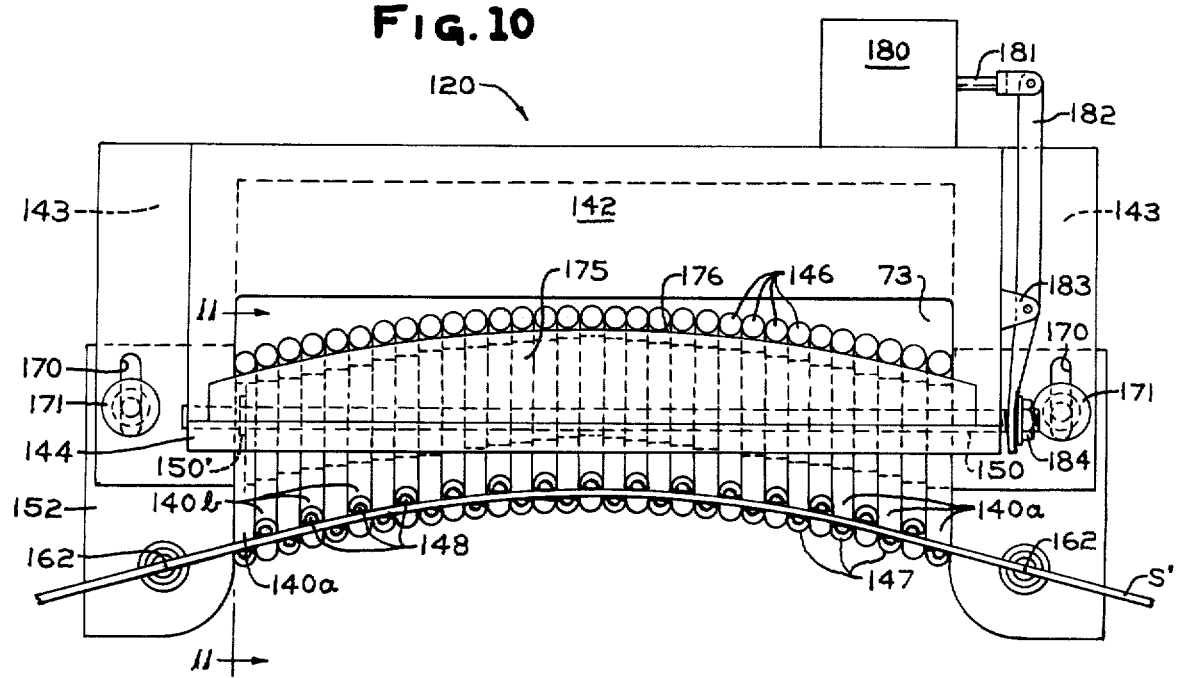
FIG. 10 is a side elevational view of the tool holder shown in FIG. 9 with the various segments adjusted to the profile of a control cam, which is contoured to that of a tire profile.
Figure 17:
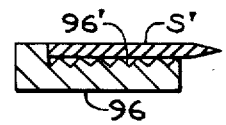
FIG. 17 is a cross-sectional view of the band-saw guide taken on lines 17—17 of FIG. 4.

Suitably secured to the lower plate member of tool support means 120 is a support member 152, which member 152 has a bore 153 extending therethrough. As seen in FIG. 10, tool support 120 has a pair of spaced support members 152, however, only one member 152 will be described. Member 152 includes a plate member 152' that is recessed, such that a motor 154 mounted thereon has its output gear 155 located in such recess, in which recess is also journaled for rotation an internally threaded nut 156. Nut 56 is secured to a spur gear 157 which meshes with output gear 155. An externally threaded tubular sleeve 158 threadedly engages nut 56 for adjustment by the rotation of nut 156 relative to sleeve 158. Rotation of sleeve 158 is prevented by making its upper end portion square and being received by a square recess in member 152. A cylindrical member 160 with a rearwardly extending stem 161 is slidably received by bore 153 in a tubular sleeve member 178. Member 160 is slotted as at 162 (FIG. 10) to provide a guideway for the band-saw S'. The end portion of stem 161 has an abutment 163 such that with a spring 164 encompassing such stem 161 such spring 164 biases such stem rightwardly as viewed in FIG. 11 to maintain member 160 in contact with tubular sleeve 158. Such member 160, stem 161, abutment 163 and its related adjustment means provides a guide means that facilitates the positioning of the band-saw to control the depth of cut made on a tire as it is trued by the band-saw. Such guide means controls the position of the band saw as it comes toward the tool support 120 for passage therethrough and away therefrom.

The upper plate member 142 has bores 170 which receive a cap screw 171 that threadedly engages support member 152. Lower plate member 141 has an elongated slot 172 to facilitate the adjustment of support member 152 and cylindrical member 160 along with its guideway for the band-saw S'. An air bag 173 is located in a chamber defined by the upper plate 142, lower plate 141 and U-shaped channel 143 with a pressure source and control means suitably connected thereto to control the pressurization and deflation thereof. A cam plate 175 has its forward edge in abutting engagement with abutment 144 and its profile edge 176 in contact with projections 146 to limit the movement of segments 140a and 140b. The profile edge 176 is shaped to the full profile of a tire or variations therein as where it is desired to trim the crown of the tire at the shoulder regions only.

A pneumatic cylinder 180 having its piston rod 181 pivotally connected to one end of a lever arm 182 is operative to actuate the rod 150. Lever arm 182 has its intermediate portion pivoted to a clevis 183 and its other end bifurcated to engage a slot in rod 150, which has a nut threaded thereon. Pressurizing the head end of cylinder 180 pivots the lever arm 182 clockwise such that enlarged head 150' releases all segments 140a and 140b, whereas pressurizing the piston rod end of cylinder 180 pivots lever arm 182 counterclockwise, which action through rod 150 and head 150' locks all segments 140a and 140b in their respective positions after such segments are positioned for guiding the band-saw. Such action of the cylinder 180 and rod 150 acts as a locking means for the segments 140a and 140b. Suitable means may be provided to adjust the movement of tool support means 120 laterally or transversely into the tire.

Figure 11:
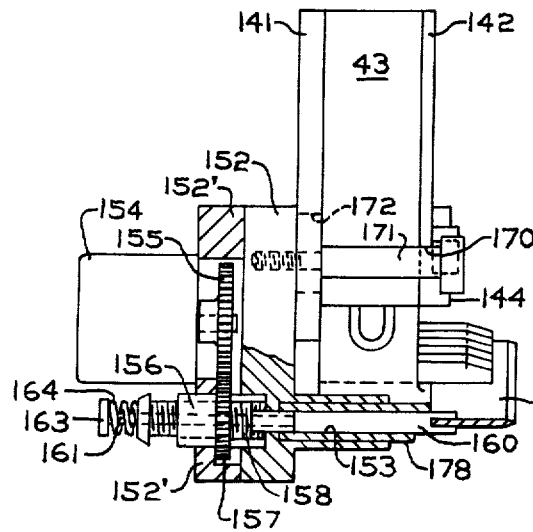
FIG. 11 is a cross-sectional view of the end portion of the tool holder shown in FIG. 9 showing the end segment and its guiding of the endless band-saw.
Figure 12:
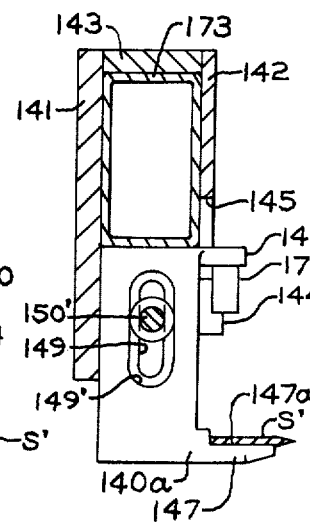
FIG. 12 is a side elevational view of one of the end adjustable segments of the modified form tool holder with a portion thereof shown in cross-section.
Figure 13:
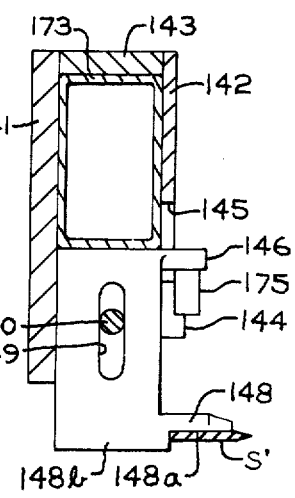
FIG. 13 is a side elevational view of one of the intermediate adjustable segments of the modified form of the tool holder with a portion thereof shown in cross-section.

In the operation of the tire truing apparatus described, the operator places a tire T' on the tire flange 127 and inflates the tire from a suitable pressure source via conduit 133 and passageway 131. The tool holder 120 is then prepared to shape the guide means thereon to the profile of the tire to be trued. The head end of cylinder 180 is pressurized which moves the piston rod 181 in a clockwise direction as viewed in FIG. 10 which thereby moves the bar 150 in a rightwardly direction to an unclamping position to permit movement of the segments 140a and 140b. Air bag 173 is then pressurized which moves the respective segments forwardly as depicted in FIG. 10 such that the respective projections 146 come in contact with the profile edge 176 of cam plate 175. The depth of cut may be adjusted by the energzation of motor 154 which rotates the threaded nut 156 to move the sleeve 158 upwardly or leftwardly as shown in FIG. 11 to position the slotted cylinder 160 to the depth of cut desired. The movement of the saw blade S' through the tool holder 120 is facilitated since cylinder 160 is permitted to rotate in the bore 153 of tubular guide member 178. The respective segments 140a and 140b are then clamped in their adjusted position by the pressurization of the piston rod end of cylinder 180 which moves clamping bar or rod 150 leftwardly as viewed in FIG. 10 such that the enlarged head portion 150' engages the counterbore portion 149' of slot 149 and clamps the respective segments in position on the tool holder 120. The guideway defined by the projections 147 and 148 of the segments is a full profile of the tire to be trimmed.

A modification of the positioning of the segments for a full profile cut may be varied by the removal of the cam plate 175 and upon pressurization of the air bag 173, the respective segments 140a and 140b are moved into contact with the profile of the tire and thereafter the locking means are actuated to secure the segments in the true profile of the tire. Motor M-2 is energized sufficiently to back off the tool holder from engagement of the tire and thereafter the operation is similar to that of the original embodiment. Motors 129 and M-1 energized to rotate tire T' and band-saw S'. The operator then moves tool support means 120 via energization of motor M-2 into proper position which may be aided by suitable stop means or limit switches located on the U-shaped member 112 in a manner well known and understood in the art. As the tire T' is rotated past the rapidly orbiting band-saw S', the band-saw is adapted to skive an extremely fine layer of approximately 0.001 to 0.002 of an inch or more off different portions of the tire, thus truing a tire to a uniform radial dimension. Such skiving can be accomplished on the tread portions, feathering the skived portions. The apparatus rapidly performs the truing operation since the band-saw is traveling at a high rate of speed as the tire is rotated. Such operation may be performed in one complete revolution of the tire, or, if desired, several revolutions, depending on the number of passes desired.

A further modification of the apparatus described is shown in FIGS. 14 through 16 wherein like parts are designated by like numerals with such apparatus being similar in all respects to the original embodiment described in FIGS. 1 through 6, except for the guide means used to guide the band-saw. The carriage C, similar to carriage C of FIG. 1 is controlled by motor M-1 on guideways for movement toward and away from a tire to be trued. Carriage C has pulleys 114 and 15 suitably journaled on the respective end portions thereof, about which pulleys 114 and 115 an endless band-saw S' is adapted to travel as previously described.

The outermost roller means 190 is mounted on the pivotal support means 191, suitably pivotally secured to the carriage C for pivotal movement about a shaft 192. Such support means 191 has a bore 193 which rotatively receives the support shaft of a pair of rollers 194 and 195, which rollers 194 and 195 have their adjacent inner peripheral edges champered or beveled such that the tapering side portions of the cutting edge of the saw S' is guided by the rotation of the champered peripheral edges while the outermost cutting edge of the band-saw S' is maintained out of contact with the rollers. Guide roller means 190 additionally has an arcuate guide plate member 196 having an arcuate surface 197 which aids in the guiding of the saw S' to and from the tool support 120. This embodiment shows 2 pairs of rollers 190 at the outermost end portion of the carriage C, however, an additional guide roller means 190 may be mounted on the arcuately shaped plate member 196 closely adjacent to the tool holder 120. Guide plate member 196 may have a plurality of V-shaped grooves 196' to reduce the heat build-up substantially. The present embodiment discloses a roller support means 200 pivotally secured in the bore 153 of the tool holder 120 and having a shaft 201 journaled for rotation thereon. Shaft 201 supports a pair of guide rollers 194–195 identical to the rollers previously described, whose beveled inner peripheral edges guiding the saw blade through the segments 140a and 140b. Such roller support means 200 may be mounted on the arcuately shaped plate member 196 in lieu of the mounting on the edge of the tool holder 120. These alternatives are obviously desirable to maintain a flexible guide means for the saw blade S', as it moves through the tool holder 120 and past the respective pulleys 114 and 115. Additional adjusting means for the saw which controls the depth of cut is shown in FIG. 15 wherein the lower plate member 121 has a bracket 205 suitably connected thereto, having a pair of spaced bores 206 and 207 which threadedly receive a screw member 208 that extends through the respective bores 206 and 207 for engagement with the blade S'. An internally threaded nut 209 journaled for rotation on bracket 205 threadedly engages member 208 for adjusting the position of the screw 208 and the saw blade S'. The operation of the modified form of the tire truing apparatus is similar to that described of the original embodiment except that the saw blade S' is more precisely controlled in its movement to and from the tool holder 120 providing a more accurate means for preventing any run out of the band-saw to obtain precise means for controlling the radial dimension of a tire which materially improves its quality and uniformity.

The cam 175 can be adjusted laterally by providing a bracket 210 that is secured to cam 174 while the other end extends rearwardly over upper plate member 142. Secured on the upper surface of plate member 142 are a pair of spaced screw means 212 which can abuttingly engage the rear portion of such bracket 210. Only one of such screw means 212 will be described. A bracket 213 is secured to the plate member 142 being centrally threaded to receive a screw 214. Screw 214 has a lock nut 215 threaded onto screw 214 such that screw 214 can be locked in position by running nut 215 into abutting engagement with bracket 213. Cam 175 can be adjusted by the manipulation of the respective screw means 212. A band-saw sharpening means 137 is suitably mounted on the carriage C adjacent to one of the pulleys to maintain the sharp edge on the band-saw S'.

Various modificatons are contemplated and may be resorted to by those skilled in the art without departing from the described invention as hereinafter defined by the appended claims.

I claim:

1. An apparatus for truing tires comprising a support means, chuck means mounted on said support means for supporting a tire, drive means operatively connected to said chuck means for rotating said chuck means and a tire mounted thereon about a central axis of rotation, a carriage mounted on said support means for movement toward and away from said central axis, power means connected to said carriage for moving said carriage, pulley means mounted on said carriage, an endless band saw mounted on said support means and trained about said pulley means for movement thereon, said band saw having a forwardly disposed cutting edge, tool support means mounted on said carriage, said tool support means having guide means thereon, the outer edge of said guide means operative to guide said band saw in the shape of a tire profile, cam means operatively connected to said guide means for shaping the profile thereof to corresponding shape said band saw to maintain said band saw a predetermined distance and shape from said central axis during passage through said tool support means.

2. A tire truing machine as set forth in claim 1 wherein said band saw has a cutting edge and side portions tapering into said cutting edge, and said guide means operative to engage said side portions to guide said band passing therethrough.

3. An apparatus for truing tires as set forth in claim 2 wherein grinding means are mounted on said carriage in the path of movement of said band saw for sharpening of said endless band saw during orbital movement on said carriage.

4. An apparatus for truing tires as set forth in claim 3 wherein said guide means includes a plurality of guide members moveable linearly toward and away from said axis of rotation, cam means in said tool support means, said guide members having a guideway therethrough for guiding said band-saw, said cam means operatively connected to said guide members to position said guide members to shape said guideway into a curved path to the profile of a tire to be trued.

5. A tire truing machine comprising support means, chuck means mounted on said support means for supporting a tire for rotation about a central axis, motive drive means connected to said chuck means for rotating said chuck means and a tire mounted thereon about said central axis, a carriage mounted in said support means for movement toward and away from said central axis, power means connected to said carriage for moving said carriage, a circular endless band-saw mounted on said carriage, drive means connected to said band-saw for driving said band-saw through an orbital path, tool support means mounted on said support means, tool support means having guide means thereon, said guide means having a plurality of guide members, each of said guide members adjustable toward and away from said central axis, cam means on said guide means connected to said guide members for positioning said guide members relative to each other, and each of said guide members having a guiding portion on its outer end portion that are cooperative with adjacent guiding portions to provide a guiding recess to guide said band-saw in a portion of its path to trim the outer peripheral surface of a tire as it is held and rotated by said chuck means.

6. A tire truing machine as set forth in claim 5 wherein each of said guide members are moveable relative to each other.

7. A tire truing machine as set forth in claim 5 wherein motive drive means are connected to said guide means for adjusting said guiding recess of said guide means in a plane that is normal to the direction of movement of said guide members toward and away from said central axis.

8. A tire truing machine comprising support means, chuck means mounted on said support means for supporting a tire for rotation about a central axis, motive drive means connected to said chuck means for rotating said chuck means and a tire mounted thereon about said central axis of rotation, a circular endless band saw mounted on said support means, drive means connected to said band saw for driving said band saw through an orbital path, tool support means mounted on said support means, said tool support means having guide means thereon for engaging a portion of said band saw to guide said band saw in a portion of its orbital path to trim the outer peripheral surface of a tire rotated by said chuck means, cam means operatively connected to said guide means for shaping said guide means into a predetermined curvilinear pattern for guiding that portion of the orbital path of said band saw for cutting a tire.

9. A tire truing machine as set forth in claim 8 wherein said guide means has a plurality of guide members movable in a direction toward or away from said central axis, and each of said guide members has an abutment engagable by said cam means to position said movable member in a given position relative to said central axis and adjoining movable members.

10. A tire truing machine as set forth in claim 8 wherein said guide means has a plurality of guide members, each of said guide members having a forwardly disposed recess portion for engaging a portion of said band saw to guide said band saw as it passes therethrough.

11. A tire truing machine as set forth in claim 8 wherein said guide means has a plurality of guide members, and each of said guide members has a forwardly disposed recessed portion that is cooperative with adjacent recessed portions to define a curved track for guiding said band saw therethrough.

12. A ire truing machine as set forth in claim 11 wherein adjusting means is operatively connected to said guide means for moving alternate guide members and their recessed portions in a direction that is parallel to the plane of blade of said band saw.

13. An apparatus for truing tires comprising a support means; chuck means mounted on said support means for supporting a tire; drive means operatively connected to said chuck means for rotating said chuck means and a tire mounted thereon about a central axis of rotation; a carriage mounted on said support means for movement toward and away from said central axis; power means connected to said carriage for moving said carriage; pulley means mounted on said carriage; an endless band-saw mounted on said support means and trained about said spaced pulleys for movement thereon; said band-saw having a forwardly disposed cutting edge, tapering side edges and side portions merging with said tapering side edge; tool support means mounted on said carriage; said tool support means having guide means; the outer edge of said guide means operative to shape said band-saw into a non-linear contour of the shape of a tire profile; roller means cooperative with said guide means and engageable with said band-saw to maintain said band-saw a predetermined distance from said central axis during passage through said tool support means; and said roller means includes pairs of rollers with adjacent champered peripheral side portions rolling engaging said tapering side edges of said band-saw.

14. A tire truing machine as set forth in claim 13 wherein biasing means are operatively connected to said guide means to maintain said band saw in contact with said roller means.

15. An apparatus for truing tires as set forth in claim 14 wherein grinding means are mounted on said carriage in the path of movement of said band-saw for sharpening of said endless band-saw during movement on said carriage.

16. An apparatus for truing tires as set forth in claim 4 wherein said roller means are mounted in a pivotal support, a guide plate is mounted on said pivotal support for guiding said band-saw from said roller means to said tool support, and said guide plate is serrated in cross section.

17. A tire truing machine comprising support means, chuck means mounted on said support means for supporting a tire for rotation about a central axis, motive drive means connected to said chuck means for rotating said chuck means and a tire mounted thereon about said central axis, a carriage mounted on said support means for movement toward and away from said central axis, power means connected to said carriage for moving said carriage, a circular endless band-saw mounted on said carriage, drive means connected to said band-saw for driving said band-saw through an orbital path, tool support means mounted on said support means, tool support means having a plurality of guide segments, each of said segments moveable toward and away from said central axis, lock means on said tool support means and connected to said guide segments for locking the adjusted positions of said guide segments relative to each other, and each of said segments having a projection in its outer end portion, the projections of all of said segments are cooperative to define a recess that guides said band-saw in a portion of its path to trim the outer peripheral surface of a tire as it is held and rotated by said chuck means.

18. A tire truing machine as set forth in claim 17 wherein one of said segments is fixed to said tool holder, and the remaining ones of said segments being moveable relative to said one segment.

19. A tire truing machine as set forth in claim 18 wherein said segments have abutments on their rearward portion, said lock means includes a cam with a cam profile mounted on said tool holder, and an inflatable air bag operative upon inflation to position said abutment of said segments into contact with said cam profile which position said outer edges into the shape of the crown of a tire.

20. A tire truing machine as set forth in claim 18 wherein guide roller means are positioned adjacent to said tool holder for guiding said saw blade to and from said tool holder, and each of said guide roller means includes a pair of rollers having adjacent beveled peripheral edges that cooperatively engage a tapering portion of said band-saw adjacent to the cutting edge to guide said cutting edge of said band-saw relative to said central axis for the truing operation as said band-saw passes through said tool holder.

21. A tire truing machine as set forth in claim 20 wherein one of said guide means has a spring biased portion operative to maintain contact with that portion of said band-saw remote from said cutting edge.

22. A tire truing machine as set forth in claim 20 wherein one of guide segments has adjusting means connected thereto for adjusting the position of said one segment on said tool holder, and said last mentioned adjusting means has an abutment operative to contact that portion of said endless band-saw remote from said cutting edge and positions said band-saw relative to said central axis in cooperation with said guide roller means.

23. A tire truing machine as set forth in claim 18 wherein said saw has a cutting edge and adjacent tapering side portions, and said tool support has a plurality of guide means engaging said tapering side portions for guiding said band-saw through said tool holder.

24. A tire truing machine as set forth in claim 23 wherein certain ones of said segments have portions biased into contact with said band-saw to maintain said band-saw in contact with said guide means.

25. An apparatus for truing tires comprising a support means, chuck means mounted on said support means for supporting a tire, drive means operatively connected to said chuck means for rotating said chuck means and a tire mounted thereon about a central axis of rotation, a carriage mounted on said support means for movement toward and away from said central axis, power means connected to said carriage for moving said carriage, pulley means mounted on said carriage, an endless band-saw mounted on said carriage and trained about said spaced pulleys for movement thereon, said band-saw having a forwardly disposed cutting edge, tool support means mounted on said carriage between said spaced pulleys, said tool support means having guide means moveable linearly toward and away from said axis of rotation, cam means on said tool support means operative to abut said guide means to shape the outer edge of said guide means to the profile of a tire to be trued, said guide means including means operative to engage said band-saw and maintain said band-saw a predetermined distance from said central axis during passage through said tool support means, adjusting means operatively connected to said cam means for adjusting the lateral position of said cam means and shifting the contour of said guide means in responses thereto.

26. An apparatus for truing tires as set forth in claim 25 wherein said band-saw has tapering side portions adjacent to said cutting edge, and wherein said guide means engaging said band saw for maintaining said predetermined distance includes guide rollers operative to engage the side portions of said band-saw to position and maintain said cutting edge a predetermined distance from said central axis.

* * * * *

UNITED STATES PATENT OFFICE
CERTIFICATE OF CORRECTION

PATENT NO. : 3,943,806
DATED : March 16, 1976
INVENTOR(S) : Mathew Kuts

It is certified that error appears in the above—identified patent and that said Letters Patent are hereby corrected as shown below:

Column 3, line 43 insert after plate ---44--- instead of 4.
Column 7, line 8 insert after nut ---184---.
Column 10, line 8 delete the word "in" and insert ---on---.
Column 11, line 5 delete the word "ire" and insert ---tire---.
Column 11, line 45 delete the number "4" and insert ---14---.

Signed and Sealed this

Twelfth Day of October 1976

[SEAL]

Attest:

RUTH C. MASON
Attesting Officer

C. MARSHALL DANN
Commissioner of Patents and Trademarks